(No Model.)
N. G. STEBBINS.
DOUBLE ACTING BELLOWS FOR MILK AERATORS.
No. 253,123. Patented Jan. 31, 1882.
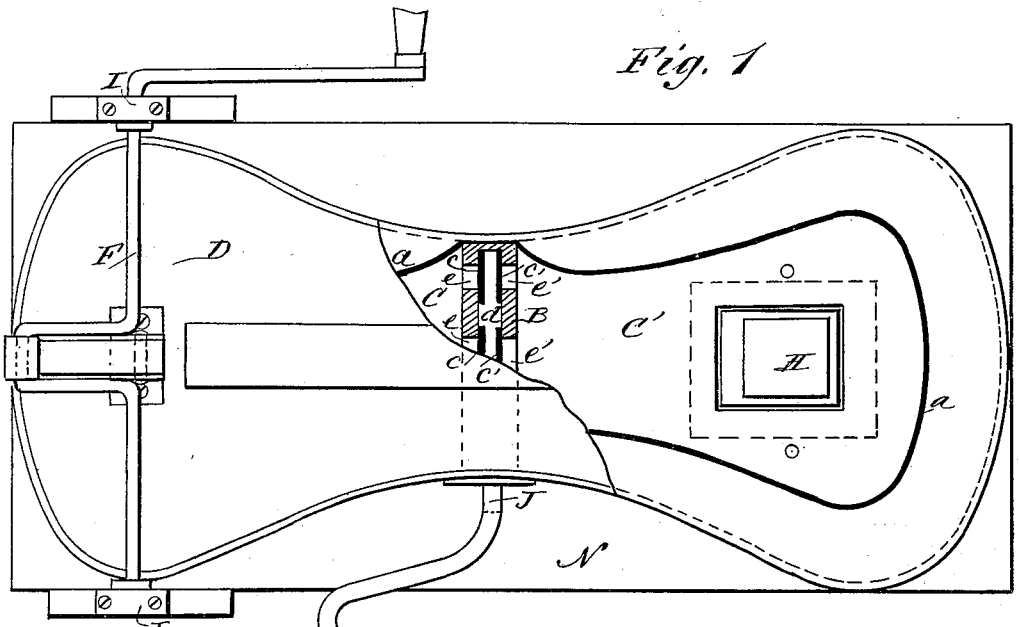
Fig. 1
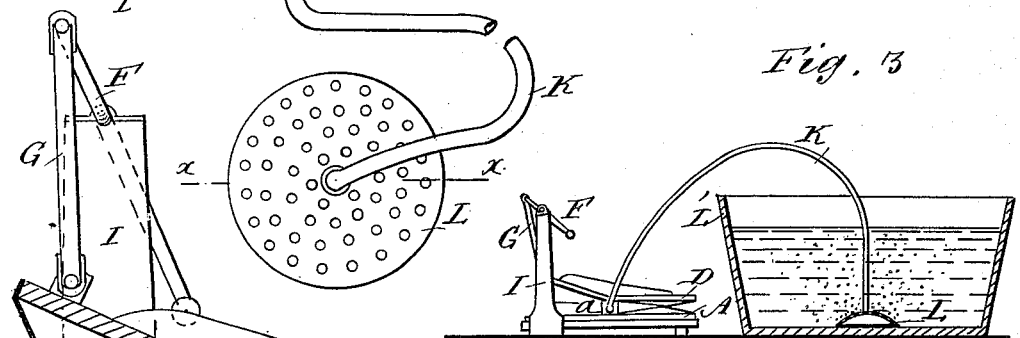
Fig. 3
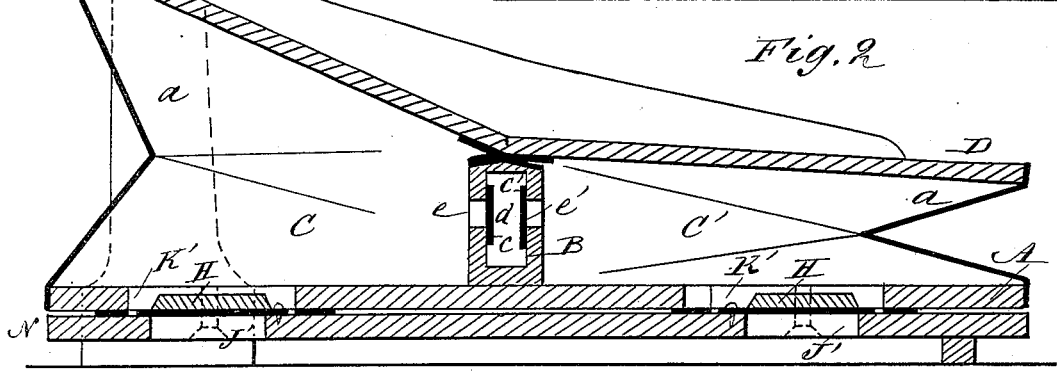
Fig. 2
WITNESSES: 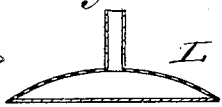  INVENTOR:
C. Neveux  
B. L. Underwood
Fig. 4  Fig. 5
N. G. Stebbins.  
BY Munn & Co  
ATTORNEYS.

UNITED STATES PATENT OFFICE.

NORMAN G. STEBBINS, OF ROME, NEW YORK.

DOUBLE-ACTING BELLOWS FOR MILK-AERATORS.

SPECIFICATION forming part of Letters Patent No. 253,123, dated January 31, 1882.

Application filed July 12, 1881. (No model.)

*To all whom it may concern:*

Be it known that I, NORMAN G. STEBBINS, of Rome, in the county of Oneida and State of New York, have invented a new and useful Improvement in Milk-Aerators, of which the following is a specification.

The object of my invention is to provide a device by means of which a continuous current of air may be forced into and through a body of milk for cooling the milk and for driving off the animal odors.

The invention consists of double-acting bellows formed with a chambered central partition, into which through valved openings air from both chambers of the bellows is forced, and from thence through a suitable conduit into the body of the milk.

In the accompanying drawings, Figure 1 is a plan view, partly in section, of my invention. Fig. 2 is a vertical longitudinal section of the same. Fig. 3 is a view showing my invention applied for aerating and cooling milk. Fig. 4 is a section taken on the line $x\,x$ of Fig. 1, and Fig. 5 shows a modification of the device shown in Fig. 4.

Similar letters of reference indicate corresponding parts.

From the center of the bottom board, A, rises the partition B, upon the top of which is hinged the upper board, D. The flexible material $a\,a$, secured to the outer edges of these boards, together with the boards themselves and the partition B, form the air-chambers C C' of the bellows.

H H represent the air-valves of the air-chambers C C'. The partition B is formed with the chamber $d$, which extends its entire length, and this chamber is formed with the side openings, $e\,e$ and $e'\,e'$, which openings are closed inside the chamber $d$ by the valves $c\,c$ and $c'\,c'$, so that when the hinged upper board, D, is rocked upon the partition B by means of the crank-shaft F and the connecting-rod G the air from the chambers C C' will alternately be forced into the chamber $d$, the valves $c\,c$ opening to pressure of air from the chamber C and closing from the pressure of air from the chamber C', and the valves $c'\,c'$ opening to pressure from the chamber C' and closing to pressure from the chamber C.

Leading from the chamber $d$ is the short tube J, to which the flexible pipe or other conduit, K, is attached, and upon the end of the conduit K may be placed the rose L, which is perforated with numerous small holes upon its upper side, as shown, so as to divide the current of air as it comes from the bellows into small jets as it issues into the milk. The rose L is adapted to sit upon the bottom of the vessel L' containing the milk, as shown in Fig. 3.

The bottom board, A, is by preference secured upon the platform N, from which rise the posts I I, on the upper ends of which the crank-shaft F takes its bearings. This platform is provided with the openings J' J', which register with the openings K' K' in the bottom board of the bellows and form the seats for the valves H H. Thus constructed, upon rocking the upper board, D, of the bellows by any convenient power a continuous current of air will be forced through the body of milk without any cessation or backward suction, which would permit or cause the milk to flow into the rose and up the conduit or tube.

Instead of using the rose L, in some instances I may use the enlarged head P, which has the large opening $p$ through it, as shown in Fig. 5, through which the air from the bellows may rush in a continuous and single stream.

Having thus fully described my invention, I claim as new and desire to secure by Letters Patent—

A double-acting bellows for milk-aerators, in which are combined valved air-chambers C C', a chambered partition, B, with inside valves over openings $e\,e'$, and a board, D, hinged to the top of said partition B, as shown and described.

NORMAN G. STEBBINS.

Witnesses:
   J. S. DYETT,
   D. M. HALL.